US008948446B2

(12) United States Patent
Susca et al.

(10) Patent No.: US 8,948,446 B2
(45) Date of Patent: Feb. 3, 2015

(54) VISION BASED ZERO VELOCITY AND ZERO ATTITUDE RATE UPDATE

(75) Inventors: Sara Susca, Minnetonka, MN (US); Viswanath Talasila, Bangalore (IN); Shrikant Rao, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1052 days.

(21) Appl. No.: 13/009,368

(22) Filed: Jan. 19, 2011

(65) Prior Publication Data

US 2012/0183179 A1 Jul. 19, 2012

(51) Int. Cl.
G06K 9/00 (2006.01)
G01C 21/16 (2006.01)
G01S 19/48 (2010.01)
G01C 23/00 (2006.01)

(52) U.S. Cl.
CPC .............. *G01C 21/165* (2013.01); *G01S 19/48* (2013.01); *G01C 23/005* (2013.01)
USPC ........... 382/103; 382/107; 382/190; 382/278; 702/150; 701/28

(58) Field of Classification Search
USPC ................... 382/103, 107, 190.278; 702/150; 701/28
See application file for complete search history.

(56) References Cited

U.S. PATENT DOCUMENTS

| 5,719,773 | A | * | 2/1998 | Choate ........................ 701/514 |
| 6,292,751 | B1 | | 9/2001 | Frank |
| 6,349,249 | B1 | | 2/2002 | Cunningham |
| 6,859,729 | B2 | | 2/2005 | Breakfield et al. |
| 6,876,945 | B2 | | 4/2005 | Emord |
| 7,467,061 | B2 | * | 12/2008 | Satoh et al. ................... 702/150 |
| 7,489,806 | B2 | * | 2/2009 | Mohri et al. .................. 382/107 |
| 8,320,709 | B2 | * | 11/2012 | Aratani et al. ................ 382/291 |
| 2008/0167814 | A1 | * | 7/2008 | Samarasekera et al. ...... 701/213 |
| 2009/0043504 | A1 | * | 2/2009 | Bandyopadhyay et al. .. 701/213 |
| 2009/0262974 | A1 | | 10/2009 | Lithopoulos |
| 2011/0040425 | A1 | * | 2/2011 | Tink ................................. 701/2 |
| 2012/0130632 | A1 | * | 5/2012 | Bandyopadhyay et al. .. 701/446 |
| 2013/0022233 | A1 | * | 1/2013 | Ma et al. ....................... 382/103 |

FOREIGN PATENT DOCUMENTS

WO 2012096876 7/2012

OTHER PUBLICATIONS

Diel et al., "Epipolar Constraints for Vision-Aided Inertial Navigation", "http://people.csail.mit.edu/seth/pubs/visionaidednay.pdf", Jan. 2005, pp. 221-228, Publisher: 7th IEEE Workshop on Applications of Computer Vision/IEEE Workshop on Motion and Video Computing.

(Continued)

*Primary Examiner* — Matthew Bella
*Assistant Examiner* — Julian Brooks
(74) *Attorney, Agent, or Firm* — Fogg & Powers LLC

(57) ABSTRACT

A method comprises receiving a first frame from at least one imaging device, receiving a second frame from the at least one imaging device, analyzing at least a portion of the first frame and at least a portion of the second frame, and indicating when at least one of a zero velocity update and a zero attitude update should be performed based on at least in part on the analysis of the at least a portion of the first frame and the at least a portion of the second frame. The first frame is captured at a first vantage point and the second frame is captured at a second vantage point.

20 Claims, 5 Drawing Sheets

(56) References Cited

OTHER PUBLICATIONS

Fletcher et al., "Real-Time Fusion of Image and Inertial Sensors for Navigation", "Wright Patterson AFB, OH, http://www.dtic.mil/cgi-bin/GetTRDoc?AD=ADA473018&Location=U2&doc=GetTRDoc.pdf", Jan. 2007, Publisher: Air Force Institute of Technology, Department of Electrical and Computer Engineering.

Ojeda et al., "Non-GPS Navigation for Security Personnel and First Responders", "Journal of Navigation", Sep. 2007, pp. 391-407, vol. 60, No. 3, Publisher: http://www-personal.umich.edu/~johannb/Papers/paper128.pdf.

Ojeda et al., "No GPS? No Problem!", "http://www.engin.umich.edu/research/mrl/urpr/In_Press/P135.pdf", Nov. 11, 2006, Publisher: University of Michigan.

Ojeda et al., "Personal Dead-Reckoning System for GPS-Denied Environments", "http://www-personal.umich.edu/~johannb/Papers/paper142.pd", Sep. 27-29, 2007, Publisher: IEEE International Workshop on Safety, Security, and Rescue Robotics, Published in: Rome, Italy.

Rantakokko et al., "Technologies for First Responder Indoor Localization", "http://www.google.com/url?sa=t&source=web&ct=res&cd=7&ved=0CCsQFjAG&url=http%3A%2F%2Fwww.kth.se%2Fees%2Fforskning%2Fpublikationer%2Fmodules%2Fpublicat", Aug. 3-4, 2009, Publisher: Worchester Polytechnic Institute: Precision Indoor Personnel Location and Tracking for Emergency Responders, Technology Workshop, Published in: Worcester, MA.

Veth et al., "Tightly-Coupled INS, GPS, and Imaging Sensors for Precision Geolocation", "Wright Patterson AFB, OH, http://www.docstoc.com/docs/1032359/Tightly-Coupled-INS-GPS-and-Imaging-Sensors-for-Precision-Geolocation", Jan. 2008, Publisher: Air Force Institute of Technology, Department of Electrical and Computer Engineering.

European Patent Office, "European Search Report from EP Application No. 12151183.6 mailed May 13, 2014", "from Foreign Counterpart of U.S. Appl. No. 13/009,368", May 13, 2014, pp. 1-6, Published in: EP.

Conte et al, "An Integrated UAV Navigation System Based on Aerial Image Matching", Mar. 1, 2008, pp. 1-10.

Grejner-Brzezinska et al., "Bridging GPS Gaps in Urban Canyons: The Benefits of ZUPTs", "Journal of the Institute of Navigation", Winter 2001-2002, available at least as early as Mar. 2002, pp. 217-225, vol. 48, No. 4.

Uijt De Haag, "Implementation of a Flash-LADAR Aided Inertial Navigator", May 5, 2008, pp. 560-567, Publisher: IEEE.

Schlaile et al., "Using Natural Features for Vision Based Navigation of an Indoor-VTOL MAV", "Aerospace Science and Technology", Oct. 1, 2009, pp. 349-357, No. 13.

European Patent Office, "Office Action from EP Application No. 12151183.6 mailed Jun. 11, 2014", "from Foreign Counterpart of U.S. Appl. No. 13/009,368", Jun. 11, 2014, pp. 1-6, Published in: EP.

\* cited by examiner

VISION BASED ZERO VELOCITY AND ZERO ATTITUDE RATE UPDATE

BACKGROUND

Satellite positioning systems, such as Global Positioning System (GPS), are used to aid in navigation by providing absolute coordinates for a person, vehicle, or other object. Navigation using GPS is referred to as "GPS-aided" navigation. At times, due to signal blockage between GPS satellites and individual GPS receivers, the signal is not received at the GPS receivers. This happens when there is no line of sight between the GPS satellites and the individual GPS receivers, such as when the receivers are under a dense tree canopy, in storms or clouds, in valleys blocked by mountains, inside mines or caves, in urban areas surrounded by tall buildings, or inside buildings or other structures. During these times of limited or no available GPS signal, a person, vehicle, or other object is said to be under "GPS-denied" navigation.

GPS-denied navigation has received increasing interest in recent years. Some approaches to GPS-denied navigation have been recently developed. Some of these approaches utilize inertial measurement units ("IMU") in conjunction with other sensors and an estimator, such as a Kalman filter, to estimate position, velocity, and attitude of a platform. One of these sensors can be a camera which can provide information regarding change in position and attitude.

Because monocular cameras cannot provide depth information unless depth estimation algorithms are used to estimate depth, a monocular camera not generally provide adequate information to calibrate the IMU. Therefore, when using only a monocular camera together with an IMU, position and velocity estimations will drift.

Drifts in velocity and/or attitude estimation can be periodically reduced to virtually zero if zero velocity updates and/or zero attitude rate updates are performed. Zero velocity update and/or zero attitude update events may be triggered automatically by logic that looks at the IMU outputs at any point in time. For low cost IMUs, zero velocity updates and/or zero attitude rate updates are not easy to reliably detect and trigger given the noisy nature of the sensor.

SUMMARY

A method comprises receiving a first frame from at least one imaging device, receiving a second frame from the at least one imaging device, analyzing at least a portion of the first frame and at least a portion of the second frame, and indicating when at least one of a zero velocity update and a zero attitude update should be performed based on at least in part on the analysis of the at least a portion of the first frame and the at least a portion of the second frame. The first frame is captured at a first vantage point and the second frame is captured at a second vantage point.

DRAWINGS

Like reference numbers and designations in the various drawings indicate like elements.

DETAILED DESCRIPTION

Figure 1:
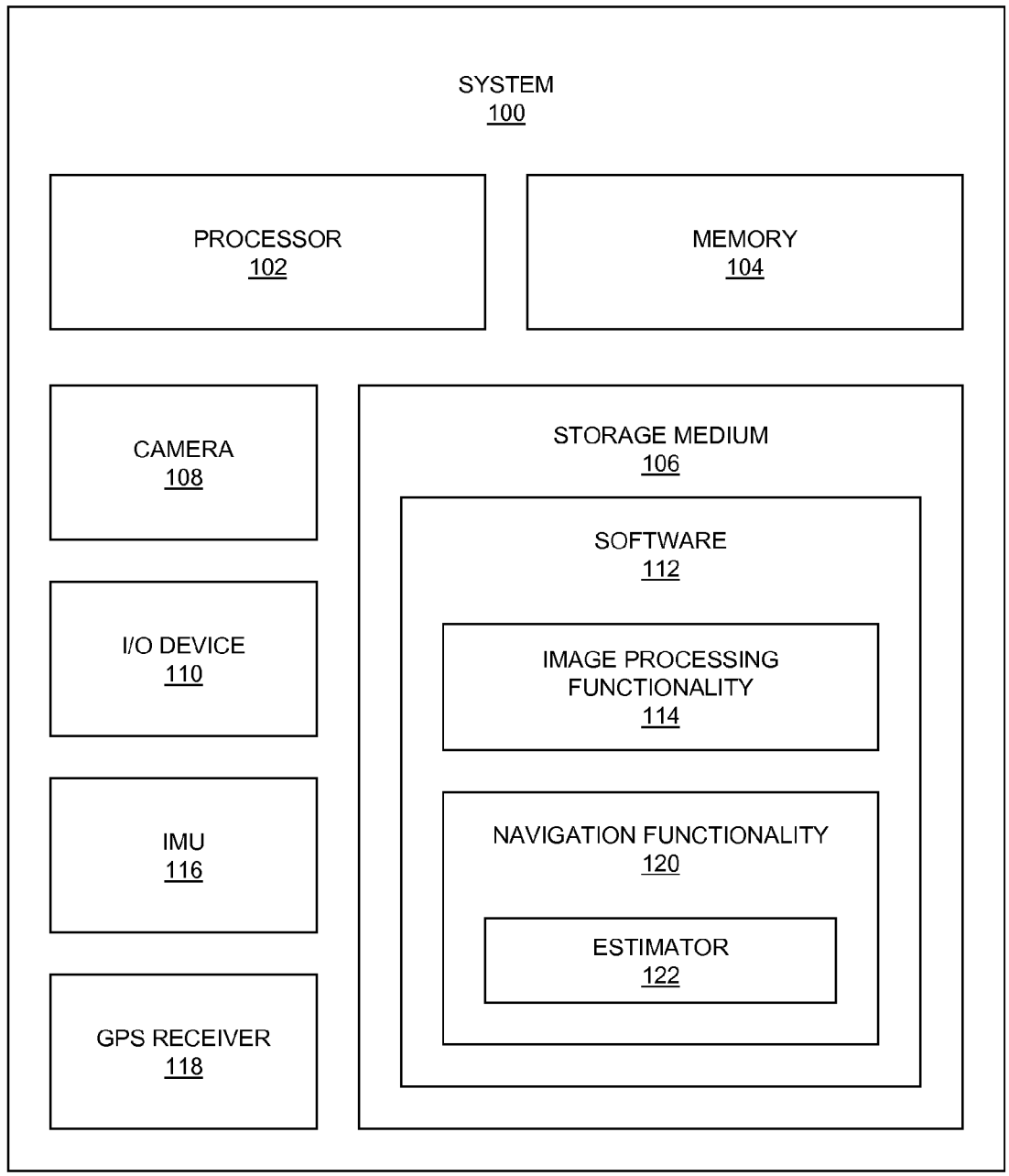
FIG. 1 is a block diagram of one embodiment of a system for triggering a vision based zero velocity update and/or a vision based zero attitude rate update.

FIG. 1 is a block diagram of one embodiment of a system 100 for triggering a vision based zero velocity update and/or a vision based zero attitude rate update. When a zero velocity update and/or zero attitude rate update is triggered, a zero velocity update and/or zero attitude rate update should be performed by either the system 100 or another system. The system 100 includes or is integrated with functionality for determining the location of a person, vehicle, or other object. Implementations of the system 100 integrating this functionality are described below.

The system 100 comprises at least one programmable processor 102 for executing software 112 that implements at least some of the functionality described here as being implemented by the system 100. The software 112 comprises program instructions that are stored (or otherwise embodied) on an appropriate storage medium or media 106 (such as flash or other non-volatile memory, magnetic disc drives, and/or optical disc drives). At least a portion of the program instructions are read from the storage medium 106 by the programmable processor 102 for execution thereby. The storage medium 106 on or in which the program instructions are embodied is also referred to here as a "program-product". Although the storage media 106 is shown in FIG. 1 as being included in, and local to, the system 100, it is to be understood that remote storage media (for example, storage media that is accessible over a network or communication link) and/or removable media can also be used. The system 100 also includes memory 104 for storing the program instructions (and any related data) during execution by the programmable processor 102. Memory 104 comprises, in one implementation, any suitable form of random access memory (RAM) now known or later developed, such as dynamic random access memory (DRAM). In other embodiments, other types of memory are used.

Although the system 100 shown in FIG. 1 includes a single processor 102, a single storage medium 106, and a single memory 104, other embodiments of the system 100 include multiple processors, storage media, and memories, among other elements.

The camera 108 is communicatively coupled to the processor 102. The camera 108 is a digital camera capable of capturing images as frames. While other implementations of the camera 108 only capture frames every few seconds, the camera 108 is capable of capturing frames at 16 hertz or faster. While cameras capable of capturing frames at various resolutions can be used, the camera 108 is capable of capturing at a resolution of at least 640 pixels wide by 480 pixels high. The camera 108 may be any type of imaging device having image sensors capable of capturing various types of electromagnetic radiation, including visible, infrared, or ultraviolet light. In implementations where the camera 108 is capable of capturing visible light, the camera 108 may capture in either color or grayscale. While the following description describes an embodiment using a single camera 108, it is possible to implement the system 100 using multiple cameras of the same or different types, such as one camera with image sensors capable of capturing visible light and another camera with image sensors capable of capturing infrared light. In multi-camera embodiments, different cameras may be used during various environmental conditions, such as in direct sunlight, in the dark, or indoors.

The system 100 further comprises at least one I/O device or interface 110 that is communicatively coupled to the processor 102. The I/O device 110 enables communication between the system 100 and other external systems and devices. In some implementations, the I/O device 110 is a display for viewing the current location, orientation, velocity, and/or acceleration of the system 100. In other implementations, the I/O device 110 is a communication link between the system 100 and an external system providing navigation functionality. In some implementations of the system 100, multiple I/O devices are present. In other implementations of the system 100 where the system 100 is self contained, no I/O devices are required or present.

In the embodiment shown in FIG. 1, the software 112 implements image processing functionality 114. The image processing functionality 114 captures image frames from the camera 108 and stores the captured image frames onto the memory 104 and/or the storage medium 106. In other embodiments, the capture image frames are stored on other memory and/or storage media which may be internal or external to the system 100. The image processing functionality 114 also extracts features from the captured frames stored in the memory 104 and/or in the storage medium 106. During operation, the image processing functionality 114 finds various features in captured frames according to methods known in the image processing arts. Because methods of feature extraction are known in the art, these methods will not be described in detail in this specification. The image processing functionality 114 also determines which, if any, of the extracted features moved between two frames. In addition, the image processing functionality 114 determines when a zero velocity update and/or a zero attitude rate update should be performed. In some embodiments, the image processing functionality 114 is implemented according to one of the methods described below.

In the implementation of the system 100 shown in FIG. 1, the system 100 also includes an inertial measurement unit ("IMU") 116 and at least one global positioning system ("GPS") receiver 118. In addition, the software 112 comprises navigation functionality 120 which utilizes the IMU 116 and the GPS receiver 118. The navigation functionality 120 determines the location of a person, vehicle, or other object using information received from the IMU 116, the GPS receiver 118, and/or the camera 108. The IMU 116 and the GPS receiver 118 are accessed by the navigation functionality 120 of the system 100.

During times of GPS-aided navigation, the navigation functionality 120 receives a GPS signal from GPS satellites received via the GPS receiver 118. The received GPS signal includes current absolute position data for the GPS receiver in latitude and longitude. In these implementations, the GPS receiver 118 handles much of the GPS processing. In other implementations, the GPS signal received from the GPS receiver 118 is not in the form of coordinates and is processed by the navigation functionality 120 into a coordinate location. During times of GPS-denied navigation, the navigation functionality 120 uses the IMU 116 (and the camera 108) to determine movement of the system 100 relative to a location last determined during GPS-aided navigation. The navigation functionality 120 of the system 100 also implements an estimator 122 to estimate position, orientation, velocity, and/or acceleration of the system 100 based on inputs from the GPS receiver 118 during times of GPS-aided navigation and the IMU 116 and the camera 108 during times of GPS-denied navigation. The estimator 122 shown in the implementation of the system 100 shown in FIG. 1 is a Kalman filter that receives inputs from the GPS receiver 118, the IMU 116, and the camera 108 to estimate the position, orientation, velocity, and acceleration of the system 100 according to methods known in the position estimating arts. In other implementations, the estimator 122 is implemented in a separate device instead of the software 112 of the system 100.

During GPS-denied navigation, the navigation functionality 120 utilizes an estimator, such as a Kalman filter, to continually estimate location and smooth out errors in the signal. When the navigation functionality 120 determines that a zero velocity update and/or a zero attitude rate update should be performed, the navigation functionality 120 performs a zero velocity update and/or zero attitude rate update according to methods known in the art. In one implementation, a zero velocity update is performed by the navigation functionality 120 by indicating to the Kalman filter that the velocity is currently zero. In another implementation, a zero attitude rate update is performed by the navigation functionality 120 by indicating to the Kalman filter that the attitude rate is currently zero. While this description focuses on the use of a Kalman filter for estimation of acceleration, velocity, position, and attitude, other estimators may also be used. The periodic zero velocity and/or zero attitude rate updates help to reduce the error introduced into the estimation done by the Kalman filter due to the drift introduced by the IMU 116.

As described above, some implementations of the system 100 are integrated with other systems for determining the location of a person, vehicle, or other object. In these implementations, the IMU 116, GPS receiver 118, navigation functionality 120, and estimator 122 are not necessary components of the system 100. In these implementations, the system 100 triggers zero velocity and/or zero attitude rate updates by outputting a trigger signal to the other systems for determining location. The trigger signal may be outputted through the I/O device 110 or another interface. The trigger signal causes a zero velocity and/or zero attitude rate update to be performed by the other system for determining location.

Figure 2:
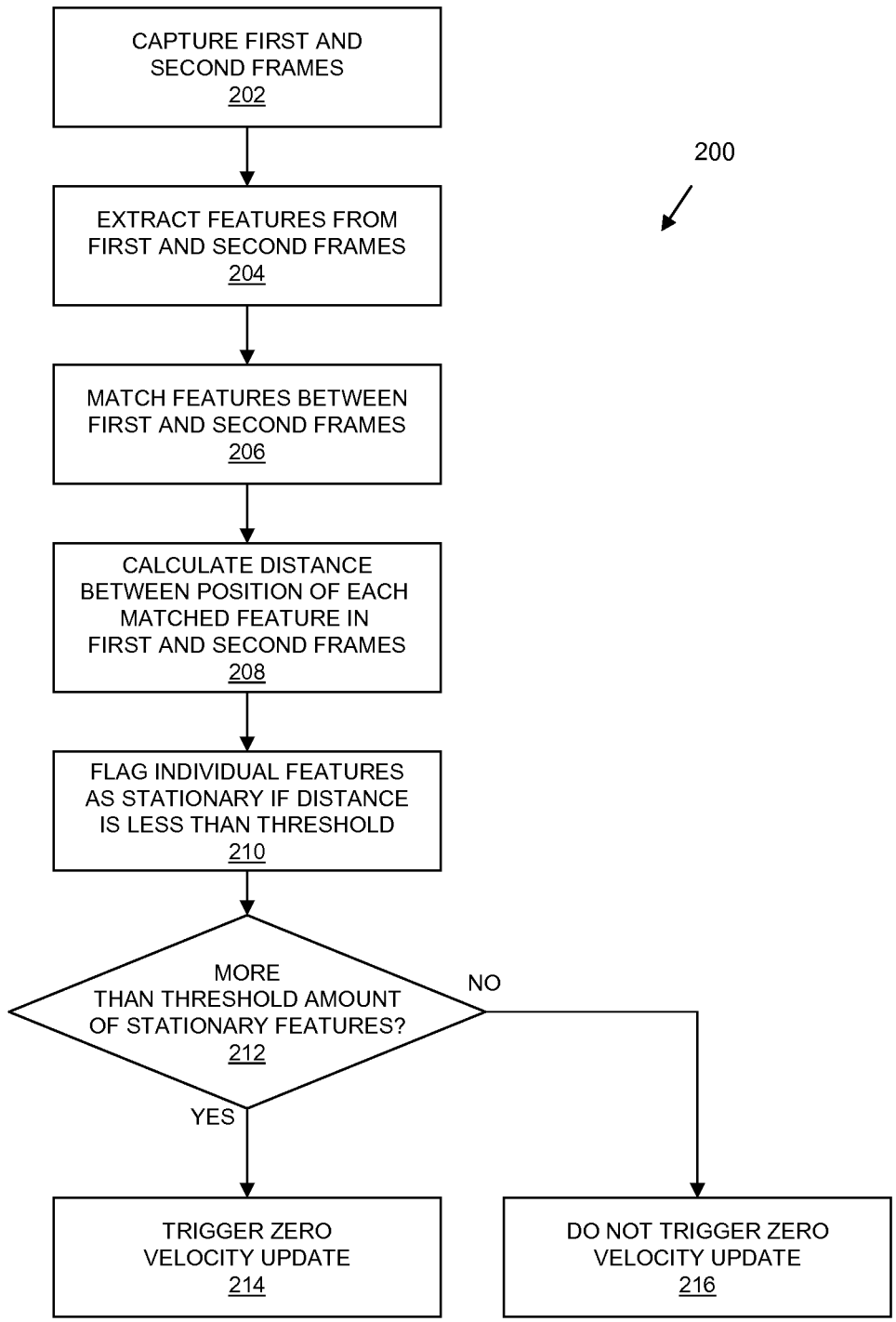
FIG. 2 is a flow diagram showing one embodiment of a method for triggering a vision based zero velocity update and/or a vision based zero attitude rate update.

FIG. 2 is a flow diagram showing one embodiment of a method 200 for triggering a vision based zero velocity update and/or a vision based zero attitude rate update. The embodiment show in FIG. 2 is described here as being implemented using the system 100 shown in FIG. 1 (though other embodiments can be implemented in other ways). The method 200 begins at block 202, where the image processing functionality 114 captures and stores a first and second frame from camera 108. The second frame is captured a predetermined amount of time after the first frame. This predetermined amount of time between frames is less than one second. Thus, the first captured frame will result in an image of the environment around the system 100 from a vantage point of the camera 108 taken at a first point in time. Similarly, the second frame will result in an image of the environment around the system 100 from a vantage point of the camera 108 taken at a second point in time. If the first frame and the second frame contain a number of features in the same position, then the system 100 is likely stationary and a zero velocity update and/or a zero attitude rate update should be performed. If the first frame and the second frame do not contain a number of features in the same position, then the system 100 is likely in motion and a zero velocity update and/or a zero attitude rate update should not be performed. The system 100 makes the determination of whether or not the system 100 is stationary based on the processing described below which determines whether the first and second frame contain a threshold number of features in the same position.

The method 200 proceeds to block 204, where features are extracted from the first and second frames. The features are extracted according to methods known in the image processing arts, such as the image descriptors Scale-Invariant Feature Transform ("SIFT") or Speeded Up Robust Features ("SURF"). The method 200 proceeds to block 206, where the features are matched between the first and second frames. The features are matched according to methods known in the image processing arts, such as the methods described in SIFT and SURF. Generally, during feature extraction and matching using these methods, individual pixels with distinctive signatures relative to immediately surrounding pixels are classified as features.

The method 200 proceeds to block 208, where, for each matched feature, a distance is calculated between a first position of the matched feature in the first frame and a second position of the matched feature in the second frame. The distance calculated between the first position and the second position may be a Euclidean distance determined in the Cartesian coordinate system, though other distance calculations can be used. Specifically, the distance between the X (horizontal) and Y (vertical) pixel coordinates of the first position and the X and Y pixel coordinates of the second position are calculated using the Pythagorean Theorem. In other embodiments, the distance is determined using other coordinate systems. While this disclosure discusses frames in two dimensional space, and thus focuses on two dimensional coordinate systems, it is contemplated that three dimensional coordinate systems could be used to determine distances in three dimensional frames created using multiple cameras or in other ways.

The method 200 proceeds to block 210, where individual features are flagged as stationary if the distance calculated between the first and second position for each individual feature is less than a threshold distance value. The threshold distance value is set so that when the distance calculated between the first position and the second position is less than the threshold distance value, it can be reliably determined that the particular feature is stationary. In some implementations, the threshold value is adjusted based on how far away objects are. Specifically, image processing could be performed to determine what part of the image is sky. This could be determined based on image intensity, such that highly intense parts of the image are labeled as sky and other parts of the image are labeled as terrain. The threshold could then be set to a smaller value for features found in the sky than for features on the terrain. Because features in the sky are probably further away than features on the terrain, the features in the sky should have smaller distance thresholds associated with them than features on the terrain because the features in the sky will move less compared to features on the ground, especially if the attitude of the platform does not change.

The method 200 proceeds to block 212, where it is determined whether more than a threshold amount of features were flagged as stationary. In some implementations, this threshold stationary feature amount is adjusted based on how many total features are extracted and/or matched between the first and second frames. If it is determined that more than the threshold amount of features were flagged as stationary, the method 200 branches to block 214, where a zero velocity update and/or a zero attitude update is triggered. If it is determined that no more than the threshold amount of features were flagged as stationary, the method 200 branches to block 216, where a zero velocity update and/or a zero attitude rate update is not triggered.

Figure 3:
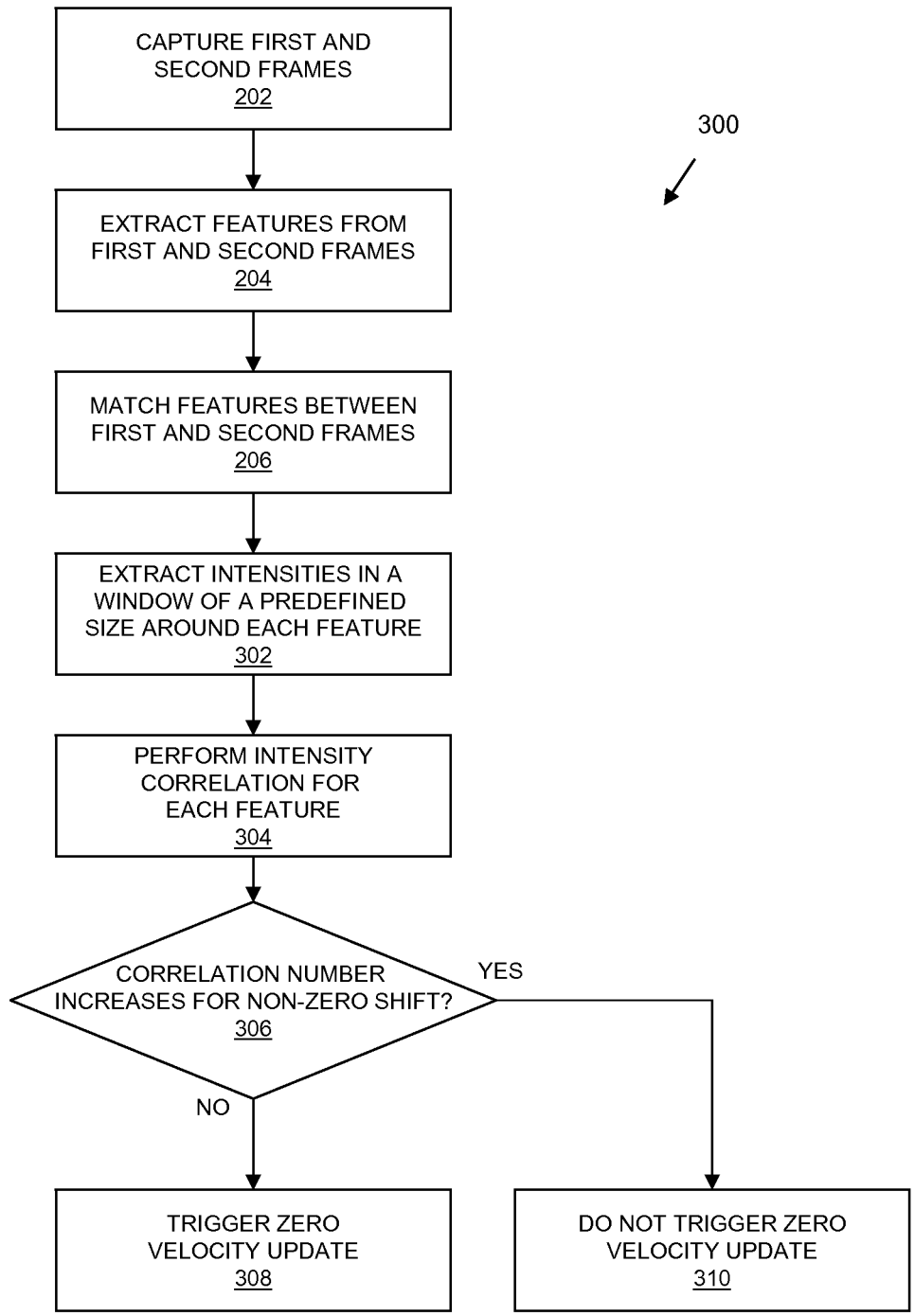
FIG. 3 is a flow diagram showing another embodiment of a method for triggering a vision based zero velocity update and/or a vision based zero attitude rate update.

FIG. 3 is a flow diagram showing another embodiment of a method 300 for triggering a vision based zero velocity update and/or a vision based zero attitude rate update. The embodiment of method 300 shown in FIG. 3 is described here as being implemented using system 100 of FIG. 1 (though other embodiments can be implemented in other ways). The method 300 begins at block 202, where the image processing functionality 114 captures and stores a first and second frame from the camera 108 as described above in method 200. The method 300 proceeds to block 204, where features are extracted from the first and second frames as described above in method 200. The method 300 proceeds to block 206, where the extracted features are matched between the first and second frames as described above in method 200.

The method 300 proceeds to block 302, where, for each feature, intensities are extracted in an operating window around the matched feature in the first frame and the same operating window around the matched feature in the second frame. The first and second windows are both the same size and overlap the same pixels in the first frame and the second frame. The operating windows are used to save time during intensity extraction by only calculating intensities for relevant portions of the frame. In other implementations, an operating window is not used and intensities are extracted for the entire frame.

The method 300 proceeds to block 304, where intensity correlation is performed on each matched feature. The method of intensity correlation performed for each matched feature is described in further detail below. The intensity correlation performed for each matched feature results in a set of correlation numbers. In the set of correlation numbers for each matched feature, there is one zero-shifted correlation number and multiple shifted correlation numbers. The zero-shifted correlation number is calculated using windows that overlap identically between the first frame and the second frame, while the shifted correlation number are calculated using windows that are offset from one another by various pixel amounts in the horizontal and vertical direction. Each window pair used in calculation of the shifted correlation numbers is offset from the other window pairs by a different amount in the horizontal and/or vertical direction.

The method 300 proceeds to block 306, where it is determined whether any of the correlation number sets for any of the matched features has a pattern of increasing correlation along any direction from any zero-shifted correlation number. A pattern of increasing correlation is present along any direction from a zero-shifted correlation number when the correlation numbers increase as they are offset progressively further from the zero-shifted correlation number. If it is determined that no correlation number sets for any of the matched features have a pattern of increasing correlation along any direction from any zero-shifted correlation number, the method 300 branches to block 308, where a zero velocity update and/or a zero attitude rate update is triggered. If it is determined that any correlation number set for any of the matched features has a pattern of increasing correlation along any direction from any zero-shifted correlation number, the method 300 branches to block 310, where a zero velocity update and/or a zero attitude rate update is not triggered.

The processing associated with block 306 is described above as only triggering a zero velocity update and/or a zero attitude rate update when none of the correlation number sets for any of the matched features has a pattern of increasing correlation along any direction from any zero-shifted correlation number. However, one implementation allows up to a threshold amount of matched features having a pattern of increased correlation along any direction from any zero-shifted correlation number while still triggering the zero velocity update and/or the zero attitude rate update. Another implementation allows up to a threshold amount of increased correlation in a direction from a zero-shifted correlation number while still triggering the zero velocity update.

Figure 4:
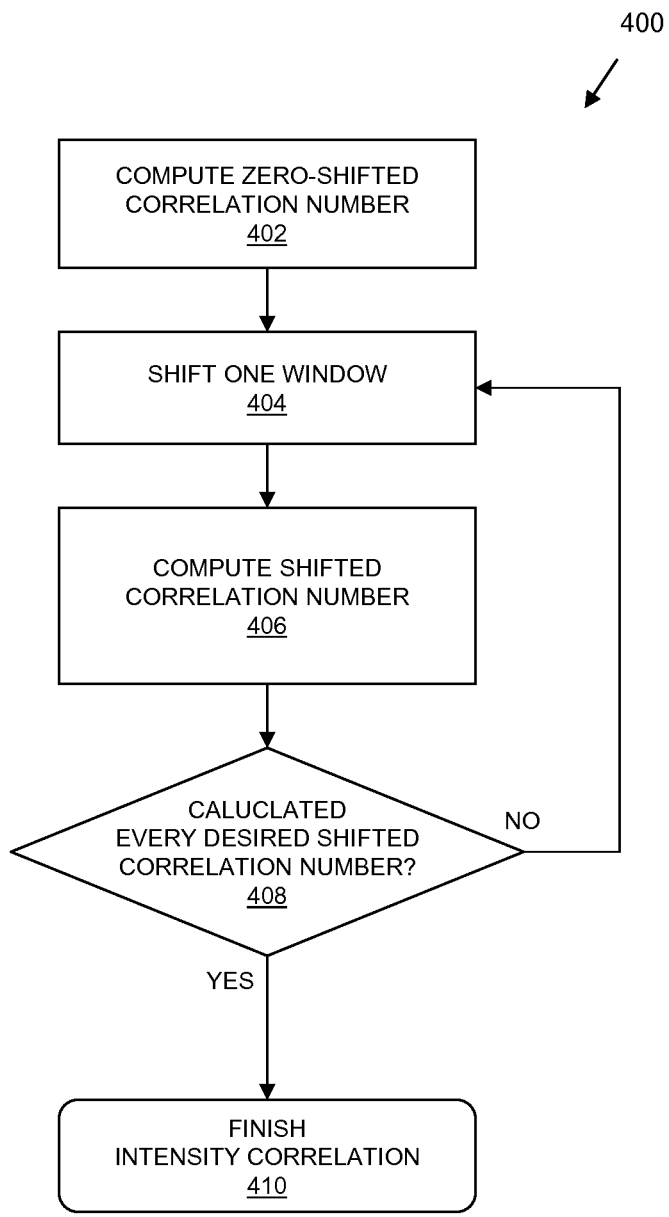
FIG. 4 is a flow diagram showing an embodiment of a method for performing intensity correlation.

FIG. 4 is a flow diagram showing an embodiment of a method 300 for performing intensity correlation. The embodiment of the method 400 shown in FIG. 4 is described here as being implemented in block 304 of method 300 using system 100 of FIG. 1 (though other embodiments can be implemented in other ways). The method 400 begins at block 402, where a zero-shifted correlation number is computed. The zero-shifted correlation number is computed when a first window in the first frame and a second window in the second frame are both the same size and overlap pixels at the same coordinate positions in the first frame and the second frame. Both the first window and the second window contain pixels that are a subset of the operating window. The computation of correlation numbers generally is described in further detail below.

The method 400 proceeds to block 404, where the first window in the first frame is shifted slightly in either the horizontal or the vertical direction so that the first window is slightly offset from the second window. Specifically, the first window could be shifted along the horizontal axis of the first frame in either the positive X or negative X direction. In addition, the first window could be shifted along the vertical axis of the first frame in either the positive Y or negative Y direction. In example implementations, the first window is shifted a few pixels in one direction. The method 400 proceeds to block 406, where a shifted correlation number is computed. The shifted correlation number is computed with the first window shifted slightly as described above.

The method 400 proceeds to block 408, where it is determined whether every desired shifted correlation number has been calculated. If it is determined that every desired shifted correlation number has not been calculated, the method 400 branches and returns to block 404, where the first window in the first frame is again shifted slightly so that first window is offset from the second window in a different way than before. The method 400 continues to shift the first window at block 404 and compute the shifted correlation number at block 406, until it is determined that every desired shifted correlation number has been calculated. As these acts in method 400 repeat, the method 400 shifts the first window such that it covers an adequate number of different coordinate positions. In example implementations, the window is shifted to a maximum of 50 pixels in each direction, though this number can be changed depending on the frame resolution and other factors.

In this embodiment, the first window is never shifted such that it extends outside of the operating window and the pixels of the first and second window always remain subsets of the operating window. This is so that there is always a full set of extracted intensity values in the first and second frames. It is contemplated that in other embodiments the first window may extend outside of the operating window for various reasons.

If it is determined that every desired shifted correlation number has been calculated at block 408, the method branches to block 410, where the intensity correlation is finished. It is desirable that there be enough shifted correlation number calculations to reliably determine whether the features are stationary or moving, but it is undesirable to have so many shifted correlation number calculations so as to unnecessarily burden the device making the calculations, thereby slowing down the implementation of the method to undesirable levels.

Figure 5:
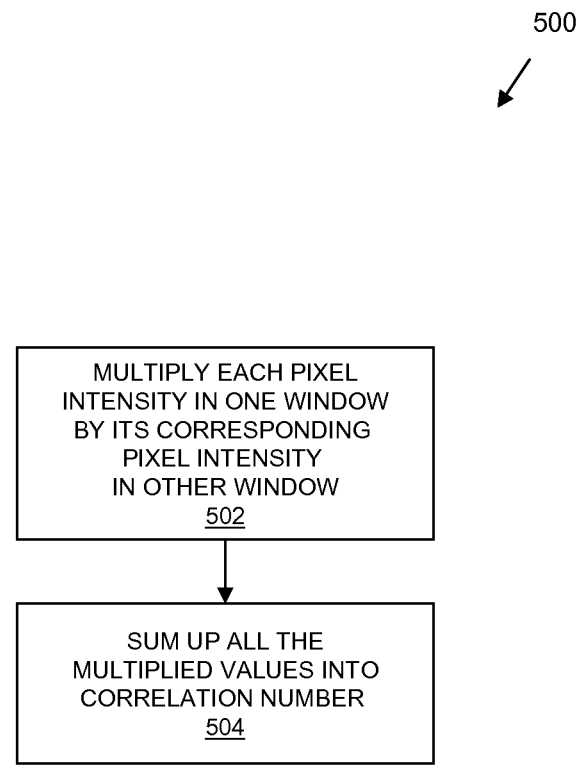
FIG. 5 is a flow diagram showing an embodiment of a method for performing correlation number computation.

FIG. 5 is a flow diagram showing an embodiment of a method 500 for performing correlation number computation. The embodiment of method 500 shown in FIG. 5 is described here as being implemented in block 402 and block 406 of method 400 using system 100 of FIG. 1 (though other embodiments can be implemented in other ways). The method 500 begins at block 502, where each pixel's pixel intensity in the first window is multiplied by its corresponding pixel intensity in the second window. The method 500 proceeds to block 504, where all of the multiplied pixel intensity values are summed into a correlation number.

The method 500 can be used to calculate both the zero-shifted correlation number in block 402 of method 400 and the shifted correlation number in block 406 of method 400 shown in FIG. 4. The pixel intensity multiplication occurs based on the multiplication of pixel intensities for the pixels in the first and second window found at the same coordinate position in the window. The pixel coordinate position will match in the first frame and the second frame for the zero-shifted correlation number, but will not match for the shifted correlation numbers. Because the first window moves around for the shifted correlation numbers, while the pixel position relative to the first and second windows is constant for each correlation number calculation, the set of overlapping pixel coordinate positions in common between the first frame and the second frame varies.

In this way, the method 500 shown in FIG. 5 determines at what shifted position, the highest correlation in pixel intensity occurs. If the highest correlation in pixel intensity occurs at or near the zero-shifted correlation number, then the feature is more likely to have been stationary between the first frame and the second frame. When the feature is stationary between frames, it is also likely to have had a zero velocity and a zero attitude rate between the frames. Under these circumstances, a zero velocity update and/or zero attitude rate update should be triggered. If the highest correlation in pixel intensity occurs far from the zero-shifted correlation number, then the feature is more likely to have been moved between the first frame and the second frame, indicating a non-zero velocity and a non-zero attitude rate. Under these circumstances, a zero velocity update and/or zero attitude rate update should not be triggered.

While the method 300 shown in FIG. 3 was described above as only performing the intensity extraction and correlation on the pixels surrounding features, in other implementations of the method 300, no feature extraction is necessary because the intensity extraction is performed on all, or most, of the pixels in the first and second frames. Then, the intensity correlation is performed using a first and second window that each cover a substantial portion of the first and second frames. In these implementations, the first and second frames would only need to be small enough to allow for calculation of shifted correlation numbers without moving the windows such that they extend beyond either the first or second frames' boundaries.

Various additional acts can be performed to improve the results using the methods above. For example, before intensity correlation is performed on the frames, the frames could be normalized to increase the accuracy of the intensity correlation. Normalizing can be achieved by methods known in the art, such as by dividing each intensity value by a maximum intensity value. In addition, level of confidence estimation can be used to help reduce the number of times a bad measurement is fed into an integrated system. Occasionally, bad frames occur which may not have enough total extracted features or enough stationary features, may have too many outlier features that are not matched, or may have a high level of noise. These bad frames can be flagged with low levels of confidence and the system can be designed to factor the level of confidence into the decision as to whether a zero velocity update and/or a zero attitude rate update is performed. Specifically, if the level of confidence is below a certain threshold, the zero velocity and/or zero attitude rate updates would not be triggered.

A number of embodiments of the invention defined by the following claims have been described. Nevertheless, it will be understood that various modifications to the described embodiments may be made without departing from the spirit and scope of the claimed invention. Additionally, features shown and described with reference to one embodiment can be combined with or replace features shown in other embodiments. Accordingly, other embodiments are within the scope of the following claims.

What is claimed is:

1. A method comprising:
    receiving a first frame from at least one imaging device, the first frame captured at a first vantage point;
    receiving a second frame from the at least one imaging device, the second frame captured at a second vantage point;
    analyzing at least a portion of the first frame and at least a portion of the second frame; and
    indicating when at least one of a zero velocity update and a zero attitude rate update should be performed based at least in part on the analysis of the at least a portion of the first frame and the at least a portion of the second frame.

2. The method of claim 1, wherein indicating when at least one of the zero velocity update and the zero attitude rate update should be performed includes outputting at least one of:
    a first signal representing a velocity of zero to a velocity input of an estimator; and
    a second signal representing an attitude rate of zero to an attitude rate input of an estimator, wherein the estimator estimates position using an input from an inertial measurement unit.

3. The method of claim 1, wherein analyzing at least a portion of the first frame and at least a portion of the second frame comprises:
    extracting features from the first frame and the second frame; and
    matching one or more features from the first frame with respective one or more corresponding features of the second frame.

4. The method of claim 3, wherein analyzing at least a portion of the first frame and at least a portion of the second frame further comprises, for each of the one or more matched features, calculating a respective distance between the respective feature in the first frame and the respective corresponding feature in the second frame and flagging that feature as stationary if the distance is less than a threshold; and
    wherein indicating when at least one of a zero velocity update and a zero attitude rate update should be performed comprises indicating that at least one of a zero velocity update and a zero attitude rate update should be performed when more than a threshold amount of the one or more matched features are flagged as stationary.

5. The method of claim 3, wherein analyzing at least a portion of the first frame and at least a portion of the second frame further comprises, for each of the one or more matched features, performing an intensity correlation to generate a respective set of correlation numbers for that matched feature that comprises a zero-shifted correlation number and a plurality of shifted correlation numbers; and
    wherein indicating when at least one of the zero velocity update and the zero attitude rate update should be performed comprises indicating that at least one of the zero velocity update and the zero attitude rate update should be performed when no correlation number sets for any of the one or more matched features have a pattern of increasing correlation along any direction from any zero-shifted correlation number.

6. The method of claim 5, further comprising, for each of the one or more matched features, extracting pixel intensities for a plurality of pixels from the first frame and the second frame; and
    wherein the intensity correlation that is performed for each of the one or more matched features comprises:
        (a) calculating the respective zero-shifted correlation number in the respective set of correlation numbers for the respective matched feature by:
            (i) positioning a respective first window at a respective first position in the first frame, wherein the respective first window covers a respective first subset of the respective first plurality of pixels;
            (ii) positioning a respective second window at the respective first position in the second frame, wherein the respective second window covers a respective first subset of the respective second plurality of pixels, wherein each pixel in the respective first window matches a pixel at an identical relative pixel position in the second window;
            (iii) multiplying the pixel intensity of each pixel in the respective first window by the pixel intensity of each corresponding pixel in an identical relative pixel position in the respective second window to create a first plurality of pixel intensity products; and
            (iv) summing each of the first plurality of pixel intensity products into the respective zero-shifted correlation number; and
        (b) calculating each of the respective plurality of shifted correlation numbers in the respective set of correlation numbers for the respective matched feature by:
            (i) positioning the first window at a respective new position in the first frame, wherein the respective first window covers a respective second subset of the respective first plurality of pixels;
            (ii) positioning the respective second window at the respective first position in the second frame, wherein the respective second window covers the respective first subset of the respective second plurality of pixels;
            (iii) multiplying the pixel intensity of each pixel in the respective first window by the pixel intensity of each corresponding pixel in the identical relative pixel position in the respective second window to create a second plurality of pixel intensity products; and
            (iv) summing each of the respective second plurality of pixel intensity products into the respective shifted correlation number and storing the respective shifted correlation number; and
    wherein indicating when at least one of the zero velocity update and the zero attitude rate update should be performed comprises indicating that at least one of the zero velocity update and the zero attitude rate update should be performed when the plurality of shifted correlation numbers indicates a pattern of increasing correlation away from the zero-shifted correlation number.

7. The method of claim 1, wherein analyzing at least a portion of the first frame and at least a portion of the second frame comprises performing an intensity correlation to generate a set of correlation numbers that comprises a zero-shifted correlation number and a plurality of shifted correlation numbers; and wherein indicating when at least one of the zero velocity update and the zero attitude rate update should be performed comprises indicating that at least one of the zero velocity update and the zero attitude rate update should be performed when the correlation number set does not have a pattern of increasing correlation along any direction from any zero-shifted correlation number.

8. A system comprising:
at least one imaging device;
at least one processor communicatively coupled to the at least one imaging device; and
wherein the at least one processor is configured to:
receive a first frame from the at least one imaging device;
receive a second frame from the at least one imaging device;
analyze at least a portion of the first frame and at least a portion of the second frame; and
indicate when at least one of a zero velocity update and a zero attitude rate update should be performed based at least in part on the analysis of the at least a portion of the first frame and the at least a portion of the second frame.

9. The system of claim 8, wherein the processor is configured to indicate that at least one of the zero velocity update and the zero attitude rate update should be performed by outputting at least one of:
a first signal representing a velocity of zero to a velocity input of an estimator; and
a second signal representing an attitude rate of zero to an attitude rate input of an estimator, wherein the estimator estimates position using input from an inertial measurement unit.

10. The system of claim 9, wherein the estimator comprises a Kalman filter.

11. The system of claim 8, wherein the processor is configured to do at least the following in order to analyze at least a portion of the first frame and at least a portion of the second frame:
extract features from the first frame and the second frame; and
match one or more features from the first frame with respective one or more corresponding features of the second frame.

12. The system of claim 11, wherein each feature is represented by a single pixel.

13. The system of claim 11, wherein the processor is further configured to do at least the following in order to analyze at least a portion of the first frame and at least a portion of the second frame, for each of the one or more matched features:
calculate a respective distance between the respective feature in the first frame and the respective corresponding feature in the second frame and flag that feature as stationary if the distance is less than a threshold; and
wherein the processor is configured to indicate that at least one of the zero velocity update and the zero attitude rate update should be performed when more than a threshold amount of the one or more matched features are flagged as stationary.

14. The system of claim 11, wherein the processor is further configured to do at least the following in order to analyze at least a portion of the first frame and at least a portion of the second frame, for each of the one or more matched features:
perform an intensity correlation to generate a respective set of correlation numbers for the respective matched feature that comprises a zero-shifted correlation number and a plurality of shifted correlation numbers; and
wherein the processor is configured to indicate that at least one of the zero velocity update and the zero attitude rate update should be performed when no correlation number sets for any of the one or more matched features have a pattern of increasing correlation along any direction from any zero-shifted correlation number.

15. The system of claim 14, wherein the processor is further configured to, for each of the one or more matched features, extract pixel intensities for a plurality of pixels from the first frame and the second frame;
wherein the processor is further configured to do at least the following in order to analyze at least a portion of the first frame and at least a portion of the second frame:
(a) calculate the respective zero-shifted correlation number in the respective set of correlation numbers for the respective matched feature by:
(i) positioning a respective first window at a respective first position in the first frame, wherein the respective first window covers a respective first subset of the respective first plurality of pixels;
(ii) positioning a respective second window at the respective first position in the second frame, wherein the respective second window covers a respective first subset of the respective second plurality of pixels, wherein each pixel in the respective first window matches a pixel at an identical relative pixel position in the second window;
(iii) multiplying the pixel intensity of each pixel in the respective first window by the pixel intensity of each corresponding pixel in an identical relative pixel position in the respective second window to create a first plurality of pixel intensity products; and
(iv) summing each of the first plurality of pixel intensity products into the respective zero-shifted correlation number;
(b) calculate each of the respective plurality of shifted correlation numbers in the respective set of correlation numbers for the respective matched feature by:
(i) positioning the first window at a respective new position in the first frame, wherein the respective first window covers a respective second subset of the respective first plurality of pixels;
(ii) positioning the respective second window at the respective first position in the second frame, wherein the respective second window covers the respective first subset of the respective second plurality of pixels;
(iii) multiplying the pixel intensity of each pixel in the respective first window by the pixel intensity of each corresponding pixel in the identical relative pixel position in the respective second window to create a second plurality of pixel intensity products; and
(iv) summing each of the respective second plurality of pixel intensity products into the respective shifted correlation number and storing the respective shifted correlation number; and
wherein the processor is configured to indicate that at least one of the zero velocity update and the zero attitude rate update should be performed when the plurality of shifted correlation numbers indicates a pattern of increasing correlation away from the zero-shifted correlation number.

16. The system of claim 8, wherein the processor is configured to do at least the following in order to analyze at least a portion of the first frame and at least a portion of the second frame: perform an intensity correlation to generate a set of correlation numbers that comprises a zero-shifted correlation number and a plurality of shifted correlation numbers; and wherein the processor is configured to indicate that at least one of the zero velocity update and the zero attitude rate update should be performed when the correlation number set does not have a pattern of increasing correlation along any direction from any zero-shifted correlation number.

17. The system of claim 8 further comprising a global positioning system receiver communicatively coupled to the at least one processor, wherein the processor receives current absolute position data from the global positioning receiver when available.

18. A program-product for triggering at least one of a vision based zero velocity update and a vision based zero attitude rate update at a system comprising at least one imaging device, the program-product comprising a non-transitory processor-readable storage medium on which program instructions are embodied, wherein the program instructions are operable to, when executed by at least one processor included in the system, cause the system to:

receive a first frame from the at least one imaging device;

receive a second frame from the at least one imaging device;

analyze at least a portion of the first frame and at least a portion of the second frame; and indicate when at least one of a zero velocity update and a zero attitude rate update should be performed based at least in part on the analysis of the at least a portion of the first frame and the at least a portion of the second frame.

19. The program product of claim 18, wherein the program instructions are operable to, when executed by the at least one processor included in the system, cause the system to analyze at least a portion of the first frame and at least a portion of the second frame by doing at least the following:

extracting features from the first frame and the second frame;

matching one or more features from the first frame with respective one or more corresponding features of the second frame; and for each of the one or more matched features, calculating a respective distance between the respective feature in the first frame and the respective corresponding feature in the second frame and flagging that feature as stationary if the distance is less than a threshold; and wherein the program instructions are operable to, when executed by the at least one processor included in the system, cause the system to indicate that at least one of the zero velocity update and the zero attitude rate update should performed when more than a threshold amount of the one or more matched features are flagged as stationary.

20. The program product of claim 18, wherein the program instructions are operable to, when executed by the at least one processor included in the system, cause the system to analyze at least a portion of the first frame and at least a portion of the second frame by doing at least the following: performing an intensity correlation to generate a set of correlation numbers that comprises a zero-shifted correlation number and a plurality of shifted correlation numbers; and wherein the program instructions are operable to, when executed by the at least one processor included in the system, cause the system to indicate that at least one of the zero velocity update and the zero attitude rate update should be performed when the correlation number set does not have a pattern of increasing correlation along any direction from any zero-shifted correlation number.

* * * * *